UNITED STATES PATENT OFFICE.

SAMUEL P. PARHAM, OF NEW YORK, N. Y.

IMPROVEMENT IN COMPOSITIONS FOR PURIFYING ILLUMINATING-GAS.

Specification forming part of Letters Patent No. 144,284, dated November 4, 1873; application filed September 13, 1873.

*To all whom it may concern:*

Be it known that I, SAMUEL P. PARHAM, of the city, county, and State of New York, have invented a new and Improved Composition for Purifying Illuminating-Gas, of which the following is a specification:

The object of my invention is to produce, for the use of gas-factories, a composition for purifying illuminating-gas, which is not only less expensive than the lime or lime-water hitherto used for absorbing the sulphureted-hydrogen gases, but which lasts also a great deal longer, being easily revivified, and avoids the noxious and deleterious influence of gas-factories on their surroundings, contributing thereby toward a better hygienic condition of large cities.

Fourteen parts of sawdust are mixed with eight parts of lime, to which a solution of two parts of copperas in five parts of water is added, and the same, together with three parts of oxide of iron, thoroughly mixed and stirred, producing thereby a reddish-brown composition. This composition is placed into large purifiers, which are alternately brought into use, so that the contents of one may be taken out, and, by exposure to the air, be revivified and charged again, till gradually, by long and repeated use, the absorptive power is spent. The sulphureted-hydrogen gases are distributed and absorbed in such a manner by the composition that no annoying smell is noticeable at all, and the gas issues from it purer than from the lime-purifiers.

The expense of removing the "spent" lime and the frequent recharging of the purifiers are dispensed with, and also the construction of the purifiers and their operation greatly simplified.

Having thus described my invention, I claim as new and desire to secure by Letters Patent—

The composition for purifying illuminating-gas, produced of sawdust, lime, copperas, oxide of iron, and water, substantially in the manner and in the proportions specified.

SAML. P. PARHAM.

Witnesses:
ANNIE PARHAM,
PAUL GOEPEL.